(12) United States Patent
Raghavan et al.

(10) Patent No.: US 12,261,669 B2
(45) Date of Patent: Mar. 25, 2025

(54) MULTIPLE PANEL ASSISTANCE INFORMATION TO DETERMINE A NETWORK CONFIGURATION

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM INCORPORATED, San Diego, CA (US)

( * ) Notice: Subject to any disclaimer, the term of this patent is extended or adjusted under 35 U.S.C. 154(b) by 346 days.

(21) Appl. No.: 17/742,984

(22) Filed: May 12, 2022

(65) Prior Publication Data

US 2023/0370142 A1  Nov. 16, 2023

(51) Int. Cl.
| | | |
|---|---|---|
| H04B 7/06 | (2006.01) |
| H04B 7/0456 | (2017.01) |
| H04B 17/336 | (2015.01) |
| H04W 52/02 | (2009.01) |

(52) U.S. Cl.
CPC ......... *H04B 7/0695* (2013.01); *H04B 7/0486* (2013.01); *H04B 7/063* (2013.01); *H04B 17/336* (2015.01); *H04W 52/0261* (2013.01)

(58) Field of Classification Search
CPC .. H04B 7/0695; H04B 17/336; H04B 7/0486; H04B 7/063; H04B 7/0623; H04B 7/0634; H04B 7/06; H04B 7/0456; H04W 52/0261
See application file for complete search history.

(56) References Cited

U.S. PATENT DOCUMENTS

| | | | |
|---|---|---|---|
| 2019/0230606 A1* | 7/2019 | Ryu | H04W 52/367 |
| 2021/0329813 A1* | 10/2021 | Shabbir | H05K 7/20136 |
| 2022/0114318 A1* | 4/2022 | Gallina | G01K 15/005 |
| 2023/0100253 A1* | 3/2023 | Zhu | H04L 41/16 706/26 |
| 2023/0199900 A1* | 6/2023 | Park | H04W 72/21 370/329 |
| 2023/0217468 A1* | 7/2023 | Hui | H04W 72/25 370/329 |
| 2023/0309171 A1* | 9/2023 | Zhou | H04W 72/23 |
| 2024/0146380 A1* | 5/2024 | Raghavan | H04B 7/0408 |

FOREIGN PATENT DOCUMENTS

WO   WO-2020172184 A1 *  8/2020  ........... H04B 7/0695

* cited by examiner

*Primary Examiner* — Mewale A Ambaye
(74) *Attorney, Agent, or Firm* — Haynes and Boone, LLP

(57) ABSTRACT

Systems and methods for wireless communication with devices equipped with multiple antenna panels are provided. A UE may transmit UE assistance information (UAI) to a wireless communication device associated with other network information such as rank indicator (RI). The UAI may include an indication of a quantity of antenna panels in use, a relative power consumption indicator, and/or a thermal overhead indicator. This information may be used by the wireless communication device to determine a network configuration which reduces the power consumption and/or thermal overhead of the UE.

26 Claims, 11 Drawing Sheets

| RI | No. of panels used | Relative power consumption/thermal overhead |
|---|---|---|
| 2 | 2 | Medium |
| 2 | 1 | Least |
| 3 | 2 | Highest |
| ... | | |

FIG. 5A

| RI | No. of panels used | Relative power consumption | Thermal overhead |
|---|---|---|---|
| 2 | 2 | Medium-High | Medium |
| 2 | 1 | Least | Least |
| 3 | 2 | Highest | Highest |
| ... | | | |

FIG. 5B

MULTIPLE PANEL ASSISTANCE INFORMATION TO DETERMINE A NETWORK CONFIGURATION

TECHNICAL FIELD

This application relates to wireless communication devices, systems, and methods, and more particularly to devices, systems, and methods for multiple panel assistance information.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G), designed to provide a lower latency, a higher bandwidth or a higher throughput, and a higher reliability than LTE. Some UEs may be equipped with multiple antenna panels and associated antenna modules. Information that is shared between the UE and other network devices does not sufficiently describe the state of UEs with respect to antenna panels, as older devices have presumed a single panel. The lack of information means that network entities such as BSs may make sub-optimal choices regarding UEs with multiple antenna panels. Therefore, there exists a need for improved methods of wireless communication with devices equipped with multiple antenna panels.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One aspect of the present disclosure includes a method of wireless communication performed by a user equipment (UE), comprising transmitting, to a wireless communication device, a rank indicator (RI). The method further comprises transmitting, to the wireless communication device, UE assistance information (UAI) associated with the RI, the UE assistance information indicates at least one of an indication of a quantity of antenna panels in use, a relative power consumption indicator, or a thermal overhead indicator. The method further comprises receiving, from the wireless communication device, a beam selection based on the RI and the UE assistance information.

Another aspect of the present disclosure includes a method of wireless communication performed by a wireless communication device, comprising receiving, from a user equipment (UE), a rank indicator (RI). The method further comprises receiving, from the UE, UE assistance information (UAI) associated with the RI, the UE assistance information indicates at least one of an indication of a quantity of antenna panels in use a relative power consumption indicator, or a thermal overhead indicator. The method further comprises transmitting, to the UE, a beam selection based on the RI and the UE assistance information.

Another aspect of the present disclosure includes a user equipment (UE) comprising a transceiver configured to transmit, to a wireless communication device, a rank indicator (RI). The transceiver is further configured to transmit, to the wireless communication device, UE assistance information associated with the RI, the UE assistance information indicates at least one of an indication of a quantity of antenna panels in use, a relative power consumption indicator, or a thermal overhead indicator. The transceiver is further configured to receive, from the wireless communication device, a beam selection based on the RI and the UE assistance information.

Another aspect of the present disclosure includes a wireless communication device comprising a transceiver configured to receive, from a user equipment (UE), a rank indicator (RI). The transceiver is further configured to receive, from the UE, UE assistance information, the UE assistance information indicates at least one of an indication of a quantity of antenna panels in use, a relative power consumption indicator, or a thermal overhead indicator. The transceiver is further configured to transmit, to the UE, a beam selection based on the RI and the UE assistance information.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

FIG. 5A illustrates an example lookup table according to some aspects of the present disclosure.

FIG. 5B illustrates an example lookup table according to some aspects of the present disclosure.

DETAILED DESCRIPTION

Figure 1:
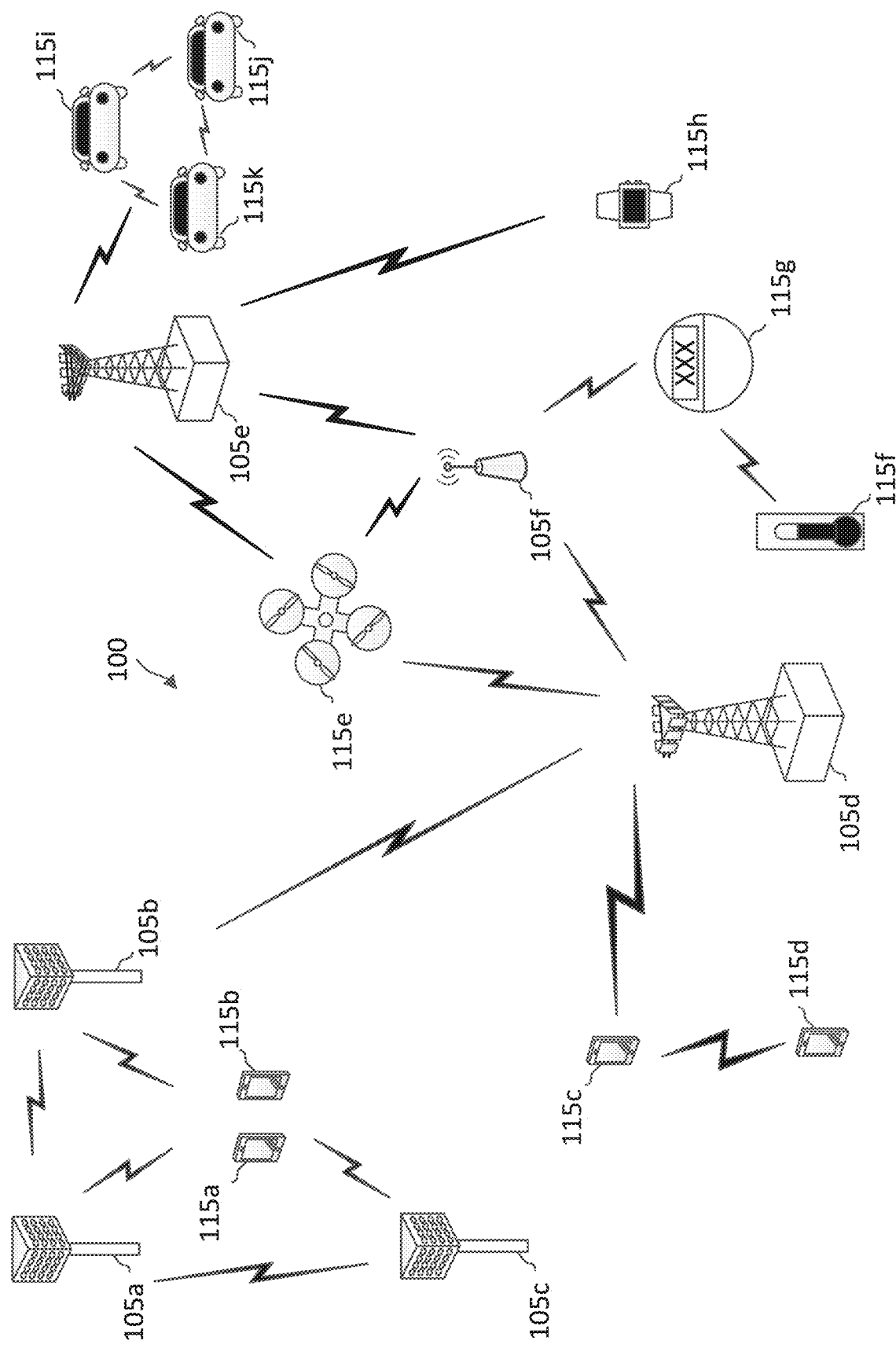
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into multiple different frequency ranges, a frequency range one (FR1), a frequency range two (PR2), and FR2x. FR1 bands include frequency bands at 7 GHz or lower (e.g., between about 410 MHz to about 7125 MHz). PR2 bands include frequency bands in mmWave ranges between about 24.25 GHz and about 52.6 GHz. FR2x bands include frequency bands in mmWave ranges between about 52.6 GHz to about 71 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present disclosure describes systems and methods for providing UE assistance information for UEs that have multiple antenna panels. In networks that utilize higher frequencies, it is more feasible for UEs to have multiple antennas, including multiple panels of antennas that may perform beamforming. UEs may have, for example, antenna panels places in different positions on a UE to provide a level of diversity and capability. A UE with multiple antenna panels may be able to simultaneously transmit and/or receive beams from one or more antenna panels. In some instances, a UE may transmit multiple beams from one panel, or may have the beams divided among panels. The amount of power consumed by the UE may increase with the number of antenna panels used for a specific number of beams. Each panel may be associated with a separate antenna module, with its own power requirements. If may be more efficient in terms of power usage to have beams provided by, or received by, a single panel.

UEs may provide certain characteristic information to a network unit, such as a base station, which allows the network unit to determine how best to communicate with the UE and other devices on the network. A rank indicator (RI) may by communicated which may correspond to a maximum number of uncorrelated paths that can be used for transmission. However, the rank indicator may not contain information about how many antenna panels are used, or how that affects power usage or thermal overhead. UE assistance information may be communicated by the UE which gives the network unit more information about how the UE is configured. For example, the UE assistance information may indicate the number of antenna panels used associated with the RI. The UE assistance information may indicate a relative power consumption associated with the RI. The UE assistance information may indicate a thermal overhead.

The UE assistance information may be determined based on a lookup table stored at the UE, associated with the RI and the number of antenna panels in use. Based on the UE assistance information, the network unit may determine a beam selection which it may transmit to the UE. The beam selection made by the network unit will be made based on network characteristics, and may also consider the UE assistance information. For example, given two pairs of beams for the UE which both perform sufficiently well in terms of communication, the network unit may select the pair of beams which based on the UE assistance information will cause less power to be consumed by the UE.

Systems and methods described herein provide many advantages. By providing UE assistance information, a network unit may make more informed decisions about scheduling resources for UEs that may reduce the power consumption and improve thermal characteristics of the UEs. A UE may consume less power and/or perform better thermally by providing the UE assistance information. Values being predetermined in a lookup table provides a simple and efficient way for the UE to determine UE assistance information.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

Sidelink communication occurs between UEs 115, for example UE 115c and UE 115d. A BS 105 may assist the UEs 115 in establishing communication, but once established, the UEs 115 may generally communicate directly via sidelink without an intermediate BS 105. A UE 115 may communicate with another UE 115 via physical sidelink control channel (PSCCH). Control information may be shared between UEs 115 by messaging control signals such as sidelink control information (SCI). SCI messages may have different formats containing different combinations of information, such as SCI-1 or SCI-2.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such asV2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. an UL-centric subframe may include a longer duration for UL communication than for UL communication.

Channel state feedback may be provided by a UE 115 to a BS 105. The channel state feedback information may include a precoding matrix indicator (PMI) and/or a channel quality indicator (CQI) corresponding to the RI. The RI may define the number of possible transmission layers for the downlink transmission under specific channel conditions. The RI may correspond to a maximum number of uncorrelated paths that can be used for downlink transmission. A UE 115 with multiple antenna panels may have the same RI for different pairs of beams, even when those pairs of beams use different antenna panel. UE assistance information may be communicated from a UE 115 to a BS 105 to assist the BS 105 in determining better network configurations that may improve the power and/or thermal performance of the UE 115.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel A TXOP may also be referred to as COT. The goal of LBT is to protect reception at a receiver from interference. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

Deployment of communication systems, such as 5G new radio (NR) systems, may be arranged in multiple manners with various components or constituent parts. In a 5G NR system, or network, a network node, a network unit, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS 105 (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
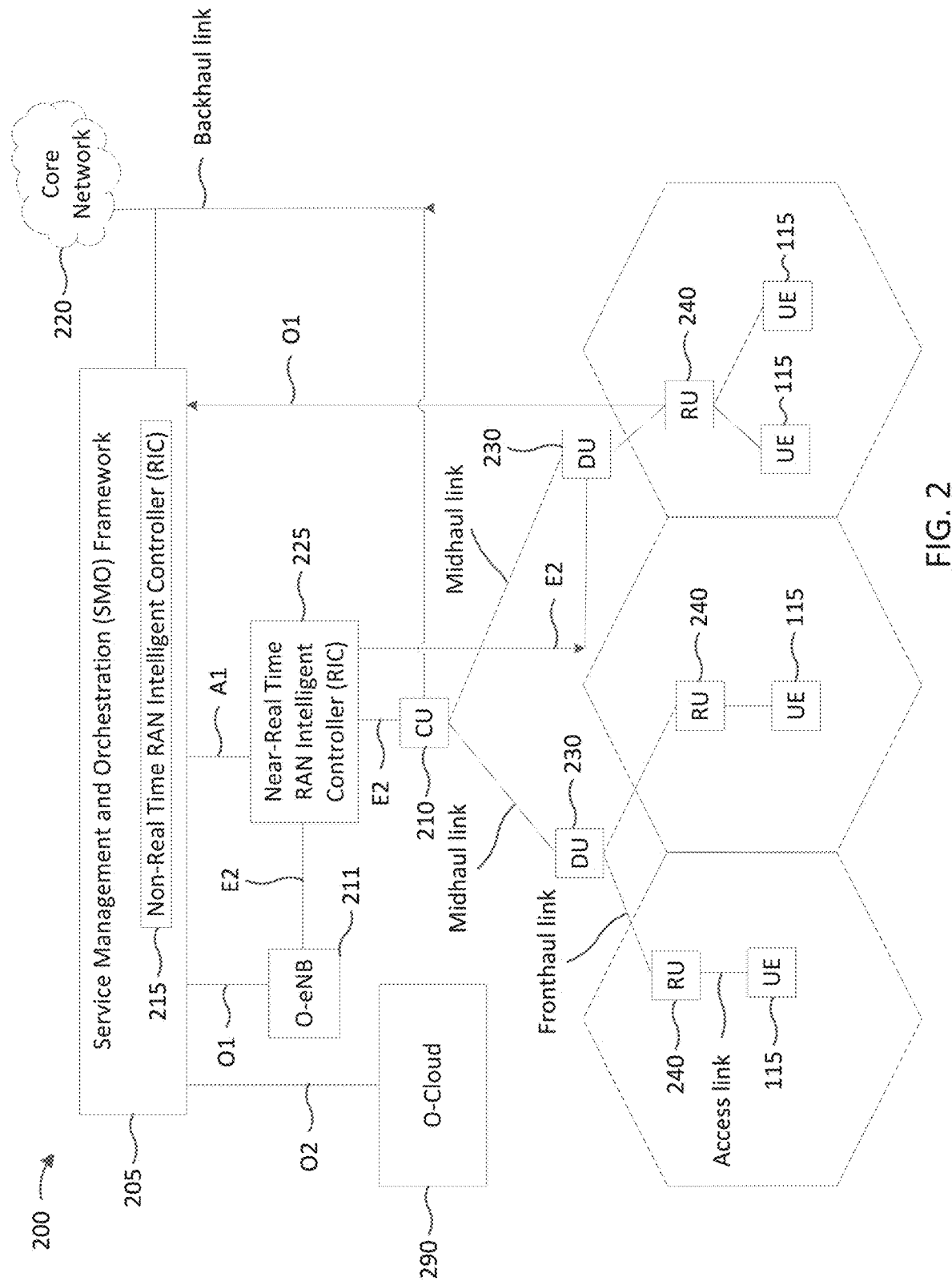
FIG. 2 illustrates an example portion of a wireless communications system that supports RU sharing techniques in wireless communications according to some aspects of the present disclosure.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 115 via one or more radio frequency (RF) access links. In some implementations, the UE 115 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 115. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
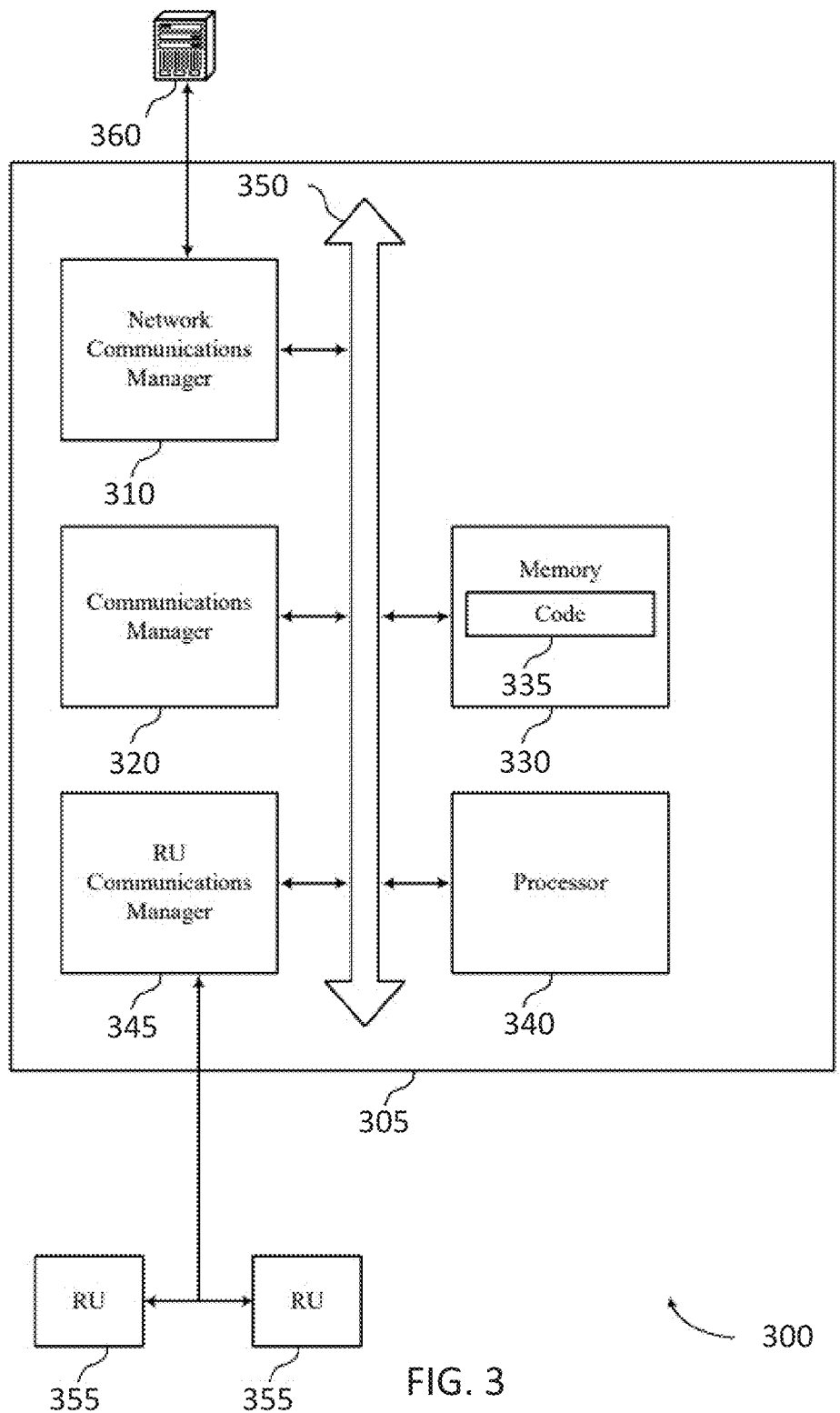
FIG. 3 illustrates a diagram of a system including a device that supports RU sharing techniques in wireless communications according to some aspects of the present disclosure.

FIG. 3 shows a diagram of a system 300 including a device 305 that supports RU sharing techniques in wireless communications in accordance with aspects of the present disclosure. The device 305 may communicate with one or more RUs 355. The device 305 may include components for bi-directional voice and data communications including components for transmitting and receiving communications, such as a communications manager 320, a network communications manager 310, a memory 330, code 335, a processor 340, and a RU communications manager 345. These components may be in electronic communication or otherwise coupled (e.g., operatively, communicatively, functionally, electronically, electrically) via one or more buses (e.g., a bus 350). One or more of the components of system 300 may perform functions as described herein with reference to FIGS. 4-10, for example functions described as performed by a base station or network unit.

The network communications manager 310 may manage communications with a core network 360 (e.g., via one or more wired backhaul links). For example, the network communications manager 310 may manage the transfer of data communications for client devices, such as one or more UEs 115.

The memory 330 may include RAM and ROM. The memory 330 may store computer-readable, computer-executable code 335 including instructions that, when executed by the processor 340, cause the device 305 to perform various functions described herein. The code 335 may be stored in a non-transitory computer-readable medium such as system memory or another type of memory. In some cases, the code 335 may not be directly executable by the processor 340 but may cause a computer (e.g., when compiled and executed) to perform functions described herein. In some cases, the memory 330 may contain, among other things, a BIOS which may control basic hardware or software operation such as the interaction with peripheral components or devices.

The processor 340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 340 may be configured to operate a memory array using a memory controller. In some other cases, a memory controller may be integrated into the processor 340. The processor 340 may be configured to execute computer-readable instructions stored in a memory (e.g., the memory 330) to cause the device 305 to perform various functions (e.g., functions or tasks supporting RU sharing techniques in wireless communications). For example, the device 305 or a component of the device 305 may include a processor 340 and memory 330 coupled to the processor 340, the processor 340 and memory 330 configured to perform various functions described herein.

The RU communications manager 345 may manage communications with RUs 355, and may include a controller or scheduler for controlling communications with UEs 115 in cooperation with RUs 355. For example, the RU communications manager 345 may coordinate scheduling for transmissions to UEs 115. In some examples, the RU communications manager 345 may provide an F1 interface within a wireless communications network technology to provide communication with RUs 355.

The communications manager 320 may support wireless communications at a network node in accordance with examples as disclosed herein. For example, the communications manager 320 may be configured as or otherwise support a means for transmitting, to a first RU, a request for a wireless resource configuration for a first time period. The communications manager 320 may be configured as or otherwise support a means for transmitting, to a second RU, an interference inquiry associated with the wireless resource configuration for the first time period. The communications manager 320 may be configured as or otherwise support a means for receiving, from the second RU, a response to the interference inquiry. The communications manager 320 may be configured as or otherwise support a means for transmitting, based on the response to the interference inquiry, a payload to the first RU for transmission during the first time period.

By including or configuring the communications manager 320 in accordance with examples as described herein, the device 305 may support techniques for RU sharing in which DUs of different MNOs may access wireless resources of other MNOs, which may increase efficiency of resource usage while provide for competition and innovation among different MNOs, may increase the reliability of wireless communications, decrease latency, and enhance user experience.

In some examples, the communications manager 320 may be configured to perform various operations (e.g., receiving, monitoring, transmitting) using or otherwise in cooperation with other components. Although the communications manager 320 is illustrated as a separate component, in some examples, one or more functions described with reference to the communications manager 320 may be supported by or performed by the processor 340, the memory 330, the code 335, or any combination thereof. For example, the code 335 may include instructions executable by the processor 340 to cause the device 305 to perform various aspects of RU sharing techniques in wireless communications as described herein, or the processor 340 and the memory 330 may be otherwise configured to perform or support such operations.

Figure 4A:
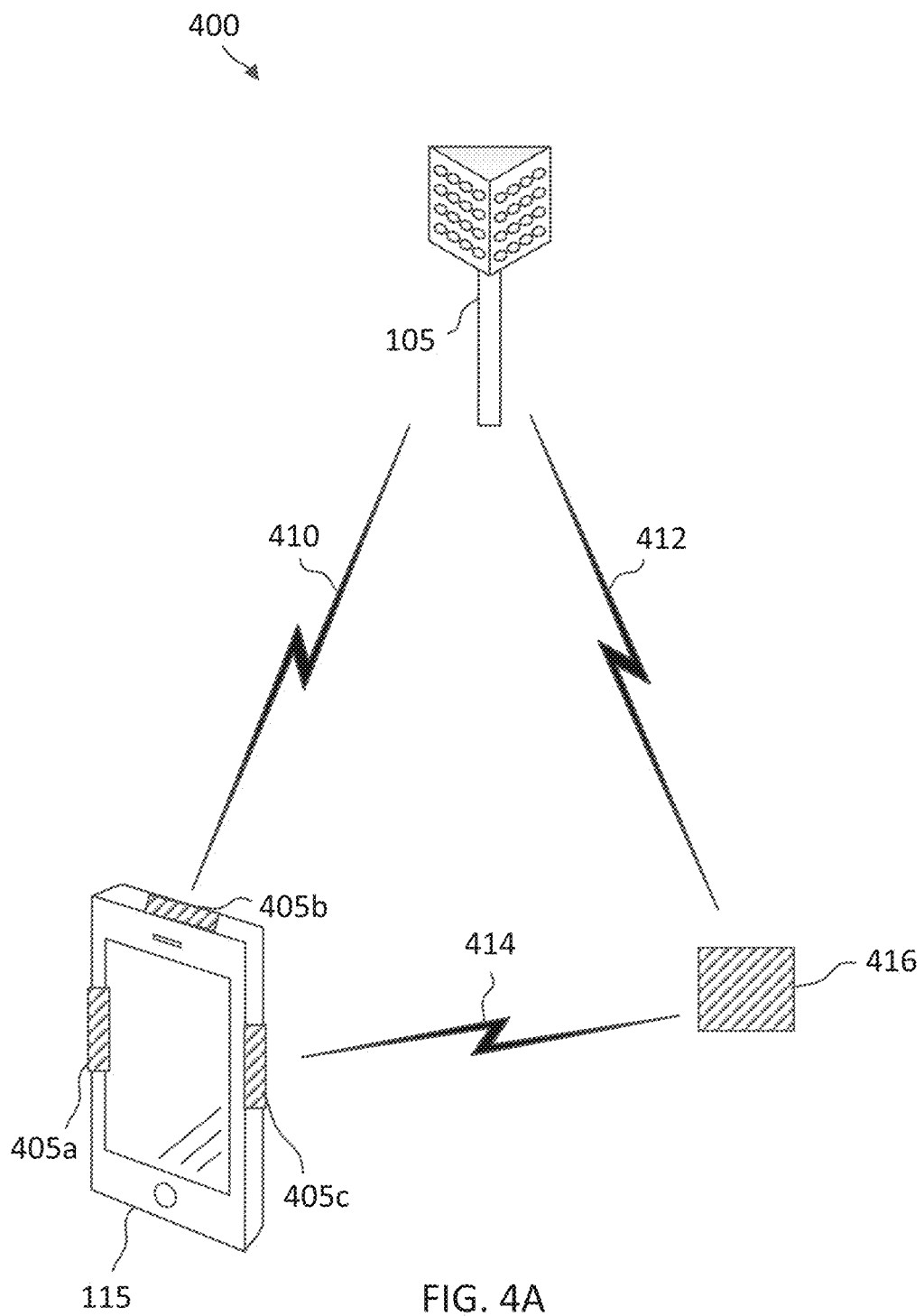
FIG. 4A illustrates an example wireless communication network according to some aspects of the present disclosure.

FIG. 4A illustrates an example wireless communication network 400 according to some aspects of the present disclosure. A UE 115 has antenna panels 405a, 405b, and 405c placed in different locations of the device to ensure good spherical coverage with hand/body blockage at millimeter wave and beyond frequencies. In some aspects, each of the antenna panels 405 is associated with different antenna modules. UE 115 is in communication with BS 105 using multiple beams. Beam 410 ensures a line-of-sight (LOS) path between the BS 105 and the UE 115. Beam 414 corresponds to steering energy from the BS 105 off a reflective object 416 which is connected at the UE 115 with beam 412. Beam correspondence is assumed between uplink and downlink transmissions. As illustrated, beam 410 is transmitted/received with antenna panel 405b. Beam 414 is transmitted/received with antenna panel 405c. This particular configuration of the UE antennas affects the power consumption and the thermal characteristics/overhead of the UE 115. In this scenario, UE 115 is using two different antenna panels 405, and is therefore using two antenna modules. Using two antenna panels/modules for two beams may cause higher power consumption and worse thermal overhead than if both beams were associated with a single antenna panel 405. As discussed with reference to FIGS. 5-10, UE assistance information may be provided to the BS 105 by the UE 115 such that information about how many antenna panels are in use and/or the impact on power consumption and thermal overhead.

Figure 4B:
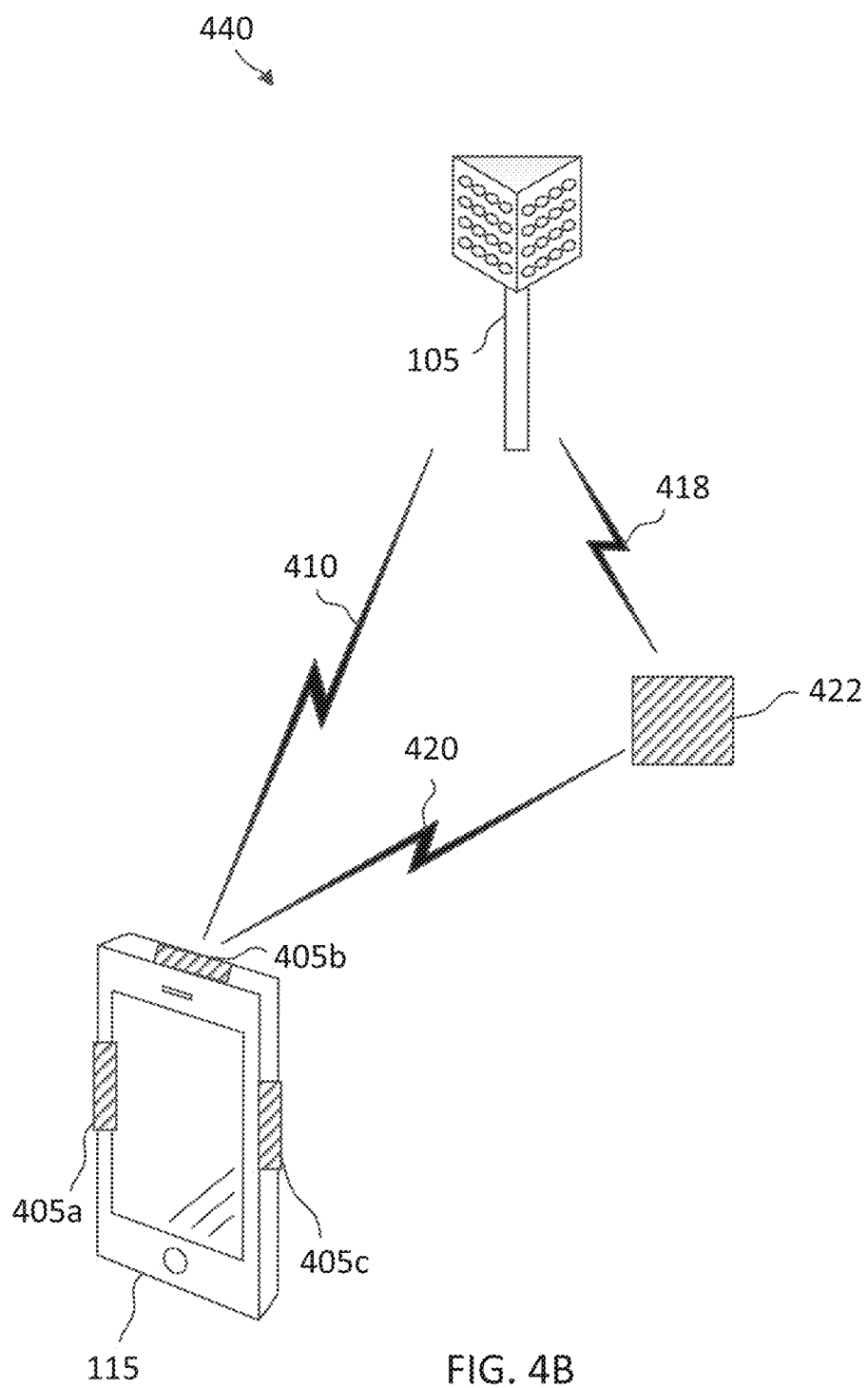
FIG. 4B illustrates an example wireless communication network according to some aspects of the present disclosure.

FIG. 4B illustrates an example wireless communication network 440 according to some aspects of the present disclosure. Similar to FIG. 4A, a UE 115 has antenna panels 405a, 405b, and 405c placed in different locations of the device to ensure good spherical coverage with hand/body blockage at millimeter wave and beyond frequencies. In some aspects, each of the antenna panels 405 is associated with different antenna modules. UE 115 is in communication with BS 105 using multiple beams. Beam 410 ensures a line-of-sight (LOS) path between the BS 105 and the UE 115. Beam 420 corresponds to steering energy from the BS 105 off a reflective object 422 which is connected at the UE 115 with beam 418. Beam correspondence is assumed between uplink and downlink transmissions. As illustrated, beams 410 and 420 are both transmitted/received with antenna panel 405b. This particular configuration of the UE antennas affects the power consumption and the thermal characteristics/overhead of the UE 115. In this scenario, UE 115 is using a single antenna panel 405, and is therefore using a single antenna module. Using a single antenna panel/module for two beams may result in lower power consumption and better thermal overhead than if both beams were associated with separate antenna panels. As discussed with reference to FIGS. 5-10, UE assistance information may be provided to the BS 105 by the UE 115 such that information about how many antenna panels are in use and/or the impact on power consumption and thermal overhead.

Figure 4C:
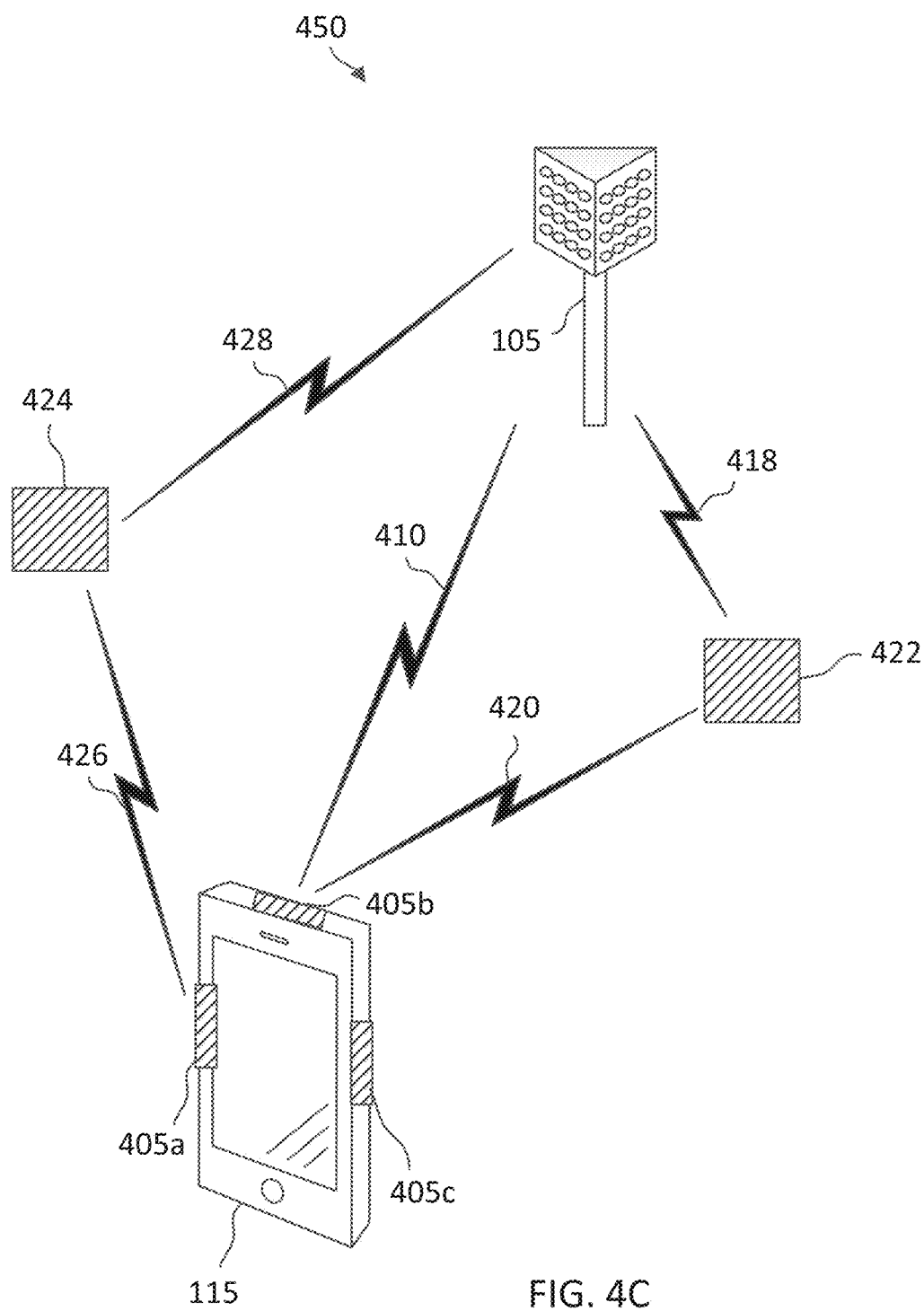
FIG. 4C illustrates an example wireless communication network according to some aspects of the present disclosure.

FIG. 4C illustrates an example wireless communication network 450 according to some aspects of the present disclosure. Similar to FIGS. 4A and 4B, a UE 115 has antenna panels 405a, 405b, and 405c placed in different locations of the device to ensure good spherical coverage with hand/body blockage at millimeter wave and beyond frequencies. In some aspects, each of the antenna panels 405 is associated with different antenna modules. UE 115 is in communication with BS 105 using multiple beams. Beam 410 ensures a line-of-sight (LOS) path between the BS 105 and the UE 115. Beam 420 corresponds to steering energy from the BS 105 off a reflective object 422 which is connected at the UE 115 with beam 418. Beam 426 corresponds to steering energy from the BS 105 off a reflective object 424 which is connected at the UE 115 with beam 428. Beam correspondence is assumed between uplink and downlink transmissions. As illustrated, beams 410 and 420 are both transmitted/received with antenna panel 405b. Beam 426 is transmitted/received with antenna panel 405a. This particular configuration of the UE antennas affects the power consumption and the thermal characteristics/overhead of the UE 115. In this scenario, UE 115 is using two different antenna panels 405, and is therefore using two antenna modules. Using two antenna panels/modules for three beams may cause higher power consumption and worse thermal overhead than if all three beams were associated with a single antenna panel 405. However, the power consumption and thermal overhead of the UE 115 may be better in this configuration than if each of the beams was associated with a separate antenna panel. As discussed with reference to FIGS. 5-10, UE assistance information may be provided to the BS 105 by the UE 115 including information about how many antenna panels are in use and/or the impact on power consumption and thermal overhead.

FIG. 5A illustrates an example lookup table according to some aspects of the present disclosure. UE assistance information as discussed with reference to FIGS. 6-10 may be determined by the UE based on a lookup table stored at the UE. The RI (the first column) and/or the number of antenna panels in use (the second column) may be used by the UE to index into the table and determine the relative power consumption and thermal overhead. In the example of FIG. 5A, the relative power consumption and thermal overhead are represented by a single value in the third column. The value of the RI used in the lookup table may be based on polarization-based transmissions, or spatial MIMO transmissions.

Relative power consumption and thermal overhead may be quantified in terms of a percentage metric where the percentage is with respect to full power availability (that is, 100% corresponds to full power availability, 50% corresponds to half of the full power available, etc). In some aspects, values in the table may include human-readable values such as "lowest", "intermediate", and "highest". In other aspects, values may be numerical, for example values in the range of 1-8, or 1-16 where 1 could correspond to the least granularity in terms of available power and 8 (or 16) could correspond to the highest granularity in terms of available power. The interpretation of the values may be predetermined or determined by a standard. For example, the relative power consumption and thermal overhead indicator may have possible values in the range of 1-16, which may represent 0-100% of maximum power available/thermal overhead allowed or possible by the UE or subcomponents of the UE such as the RF and/or digital parts of the modem. In an example, a UE operating with an RI of 3, using two antenna panels, based on the lookup table would determine the relative power consumption/thermal overhead to be "highest" as illustrated.

FIG. 5B illustrates an example lookup table according to some aspects of the present disclosure. The lookup table in FIG. 5B may be used in the same manner as the lookup table in FIG. 5A. The main difference, however, is that the relative power consumption and thermal overhead are individual values in FIG. 5B. In some instances, the number of possible values, and therefore the granularity, associated with the relative power consumption indicator may be different than the number of possible values for the thermal overhead indicator. For example, the thermal overhead may have four possible values, and the relative power consumption indicator may have eight possible values. In further aspects, the values may have a value that represents a real value such as power in mW.

In an example, a UE operating with an RI of 2, using two antenna panels, based on the lookup table would determine the relative power consumption to be "Medium-High," and thermal overhead to be "Medium" as illustrated.

Figure 6:
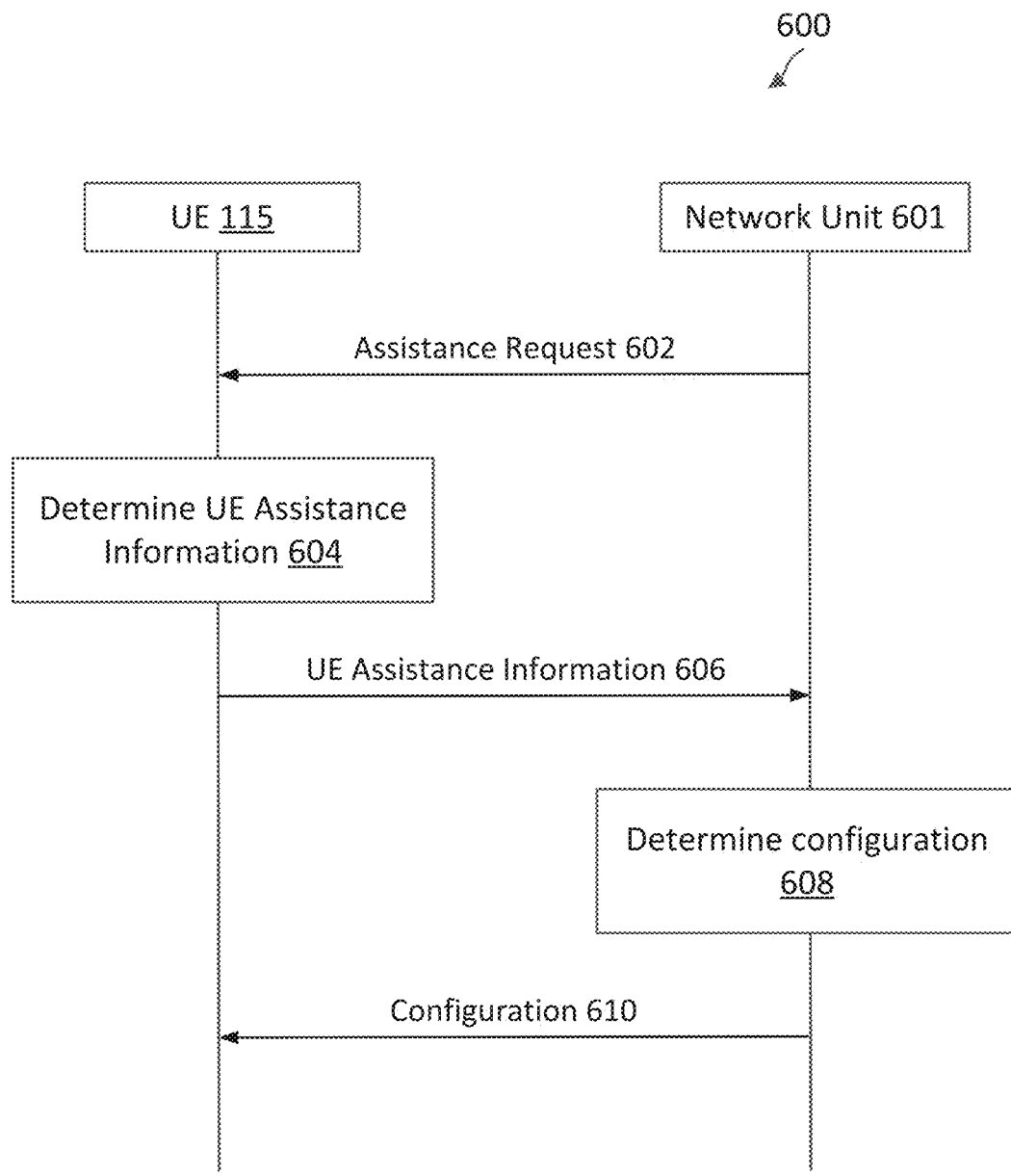
FIG. 6 is a signaling diagram according to some aspects of the present disclosure.

FIG. 6 is a signaling diagram 600 according to some aspects of the present disclosure. The diagram 600 is employed by a BS 105 such as the BSs 105 discussed with reference to FIGS. 1-4, and UE 115 such as the UEs 115 discussed with reference to FIGS. 1-4.

In some aspects, the BS 105 may be a single BS 105, or may be a disaggregated network unit such as a CU 210 and DU 230. BS 105 may utilize one or more components, such as the processor 702, the memory 704, the assistance information module 708, the transceiver 710, the modem 712, and the one or more antennas 716 shown in FIG. 7, and the UE 115 may utilize one or more components, such as the processor 802, the memory 804, the assistance information module 808, the transceiver 810, the modem 812, and the one or more antennas 816 shown in FIG. 8. As illustrated, the signaling diagram 600 includes a number of enumerated actions, but aspects of FIG. 6 may include additional actions before, after, and in between the enumerated actions. In some aspects, one or more of the enumerated actions may be omitted, combined together, or performed in a different order.

At action 602, network unit 601 transmits a message to UE 115 requesting UE assistance information. The request may be transmitted/received, for example, via an RRC, DCI, SCI, or other suitable message via PDCCH, PSCCH, PUCCH, or other suitable channel. In other aspects, the UE assistance information may not be explicitly requested, but sent in response to a change in the operation of the UE 115, such as a change in the number of antenna panels in use.

At action 604, the UE 115 determines the UE assistance information. This may be performed, for example, by using a lookup table such as the exemplary tables in FIGS. 5A and 5B. Based on the RI and the number of antenna panels (which itself may be included in the UE assistance information), the UE 115 may determine the relative power consumption and thermal overhead, or a value representing both jointly.

At action 606, the UE assistance information is transmitted from the UE 115 to the network unit 601. The UE assistance information may be transmitted together with an RI, for example in the same message. The UE may transmit the UE assistance information via an RRC message, UCI, an UL MAC CE, or other suitable communication, using PUCCH, PSCCH or another suitable channel. The UE assistance information may indicate at least one of a quantity of antenna panels in use, a relative power consumption indicator, or a thermal overhead indicator. The UE assistance information, for example, may include only the quantity of antenna panels in use. In another example, the UE assistance information may include both a relative power consumption indicator and a thermal overhead indicator. In another example, the UE assistance information may only include a relative power consumption indicator.

At action 608, the network unit 601 determines a configuration (e.g., a beam configuration for the UE 115) based at least in part on the UE assistance information. The network unit 601 may determine a beam selection that is not the highest performing beam selection in terms of network characteristics if it has better relative power or thermal overhead characteristics and still performs sufficiently well.

The network unit 601 may also base the beam selection on an interference measurement associated with an uplink transmission or transmissions of the UE 115, preferring a beam selection that has less interference. In aspects where only the number of panels is communicated as the UE assistance information, the network unit 601 may estimate the relative power consumption and thermal overhead based on that information together with the RI.

At action 610, the network unit 601 transmits the configuration to the UE 115. The beam selection may be transmitted, for example, via an RRC, DCI, SCI, or other suitable message type using PUCCH, PDCCH, PSCCH, or other suitable channel.

Subsequent communication with the UE may be based on the beam selection, for example for PUSCH, PDSCH, and/or PSSCH communications. For example, the wireless communication device may have previously communicated with the UE 115 that was using two antenna panels, each with a single transmit and/or receive beam. The network unit 601 may transmit a beam selection, for example, that allows the UE to use two transmit and/or receive beams from the same antenna panel. By reducing the number of antenna panels and/or antenna modules in use, total power consumption of the UE 115 may be reduced in some instances.

Figure 7:
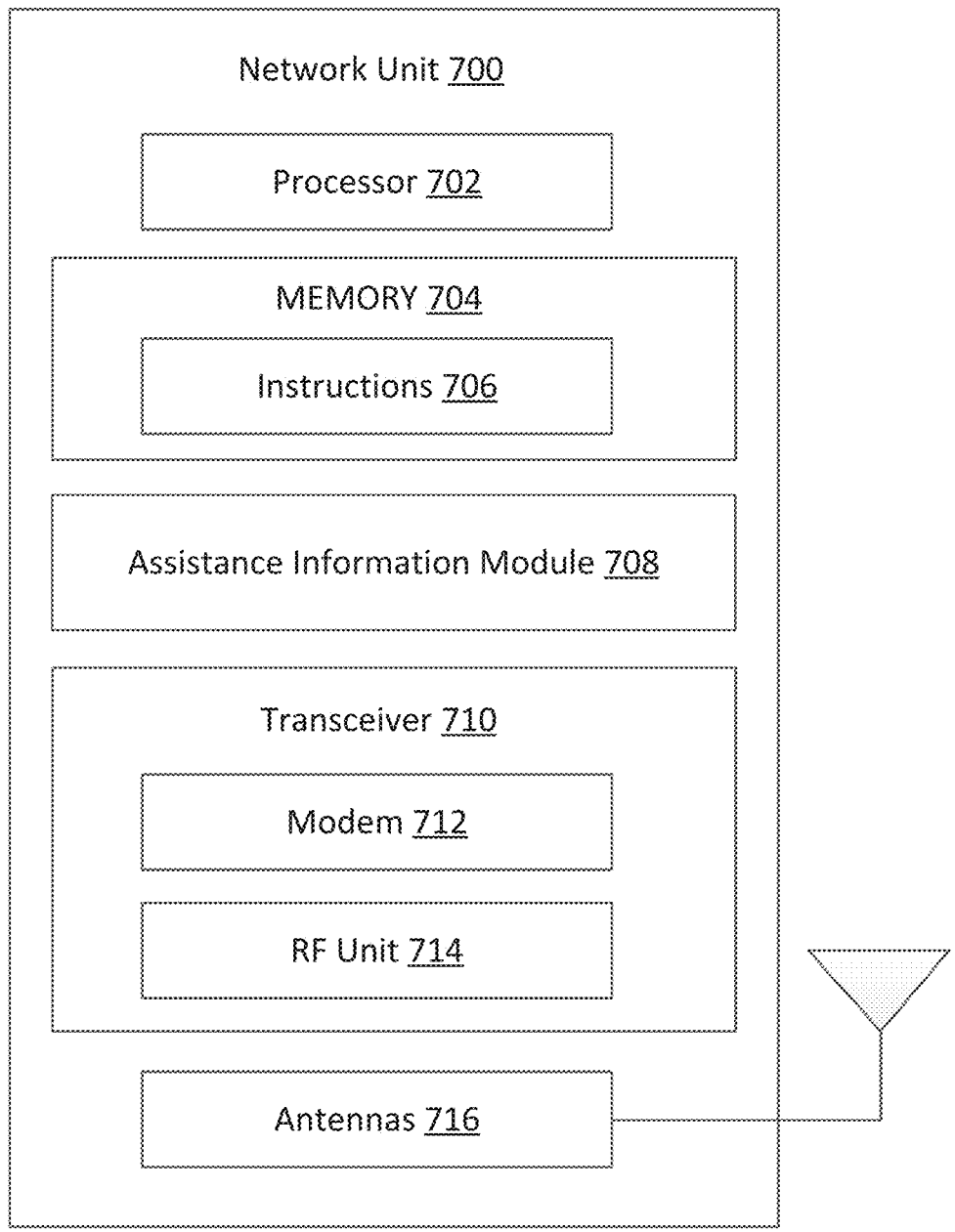
FIG. 7 illustrates a block diagram of a network unit according to some aspects of the present disclosure.

FIG. 7 is a block diagram of an exemplary network unit 700 according to some aspects of the present disclosure. The network unit 700 may be a BS 105 as discussed in FIG. 1, or be made up of disaggregated units as described with reference to FIGS. 2-3. As shown, the network unit 700 may include a processor 702, a memory 704, an assistance information module 708, a transceiver 710 including a modem subsystem 712 and a RF unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 4-6 and 9-10. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The assistance information module 708 may be implemented via hardware, software, or combinations thereof. For example, the assistance information module 708 may be implemented as a processor, circuit, and/or instructions 706 stored in the memory 704 and executed by the processor 702. In some examples, the assistance information module 708 can be integrated within the modem subsystem 712. For example, the assistance information module 708 can be implemented by a combination of software components (e.g., executed by a DSP or a general processor) and hardware components (e.g., logic gates and circuitry) within the modem subsystem 712. The assistance information module 708 may communicate with one or more components of network unit 700 to implement various aspects of the present disclosure, for example, aspects of FIGS. 4-6 and 9-10.

In some aspects, the assistance information module 708 may be configured to receive, from a UE, a rank indicator (RI). The RI may be received as part of channel state feedback information. The channel state feedback may be received, for example, via an RRC message, UL MAC CE, channel state information (CSI) message, a synchronization signal block (SSB), or other suitable communication, using PUCCH, PSCCH, or another suitable channel. The channel state feedback information may include a precoding matrix indicator (PMI) and/or a channel quality indicator (CQI) corresponding to the RI. The RI may define the number of possible transmission layers for the downlink transmission under specific channel conditions. The RI may correspond to a maximum number of uncorrelated paths that can be used for downlink transmission. The RI, however, may not contain information directly related to the number of antenna panels or modules used by the UE in achieving the indicated RI.

The assistance information module 708 may be configured to receive, from a UE, UE assistance information (UAI) associated with the RI. The UE assistance information may be received together with the RI, for example in the same message. The assistance information module 708 may receive the UE assistance information via an RRC message, UCI, an UL MAC CE, or other suitable communication, using PUCCH, PSCCH or another suitable channel. The UE assistance information may indicate at least one of a quantity of antenna panels in use, a relative power consumption indicator, or a thermal overhead indicator. The UE assistance information, for example, may include only the quantity of antenna panels in use. In another example, the UE assistance information may include both a relative power consumption indicator and a thermal overhead indicator. In another example, the UE assistance information may only include a relative power consumption indicator. In some aspects, the UE assistance information may be received in response to a request from the network unit 700. That is, the network unit 700 may transmit a request for assistance to the UE, and receive the UE assistance information in response to transmitting the request. The request may be transmitted, for example, via an RRC, DCI, SCI, or other suitable message via PDCCH, PSCCH, PUCCH, or other suitable channel. In other aspects, the UE assistance information may be received in response to a change in the operation of the UE, such as a change in the number of antenna panels in use.

The assistance information module 708 may further be configured to transmit, to the UE, a beam selection based on the RI and the UE assistance information. The beam selection may be transmitted, for example, via an RRC, DCI, SCI, or other suitable message type using PUCCH, PDCCH, PSCCH, or other suitable channel. The assistance information module 708 may determine a beam selection that is not the highest performing beam selection in terms of network characteristics if it has better relative power or thermal overhead characteristics and still performs sufficiently well.

Subsequent communication with the UE may be based on the beam selection, for example for PUSCH, PDSCH, and/or PSSCH communications. For example, the network unit 700 may have previously communicated with the UE that was using two antenna panels, each with a single transmit and/or receive beam. The wireless communication device may transmit a beam selection that allows the UE to use two transmit and/or receive beams from the same antenna panel. By reducing the number of antenna panels and/or antenna modules in use, total power consumption of the UE may be reduced in some instances.

The assistance information module 708 may also base the beam selection on an interference measurement associated with an uplink transmission or transmissions of the UE, preferring a beam selection that has less interference. In aspects where only the number of panels is communicated as the UE assistance information, the assistance information module 708 may estimate the relative power consumption and thermal overhead based on that information together with the RI.

As shown, the transceiver 710 may include the modem subsystem 712 and the RF unit 714. The transceiver 710 can be configured to communicate bi-directionally with other devices, such as the UEs 115 and/or BS 105 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., PDCCH DCI, MAC-CE, PSSCH, etc.) from the modem subsystem 712 (on outbound transmissions) or of transmissions originating from another source such as a UE 115, and/or UE 800. The RF unit 714 may be further configured to perform analog beamforming in conjunction with the digital beamforming. Although shown as integrated together in transceiver 710, the modem subsystem 712 and/or the RF unit 714 may be separate devices that are coupled together at the network unit 700 to enable the network unit 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices and provide the received data messages for processing and/or demodulation at the transceiver 710. The transceiver 710 may provide the demodulated and decoded data (e.g., PUSCH, PSSCH, etc.) to the assistance information module 708 for processing. The antennas 716 may include multiple antennas of similar or different designs in order to sustain multiple transmission links.

In an aspect, the network unit 700 can include multiple transceivers 710 implementing different RATs (e.g., NR and LTE). In an aspect, the network unit 700 can include a single transceiver 710 implementing multiple RATs (e.g., NR and LTE). In an aspect, the transceiver 710 can include various components, where different combinations of components can implement different RATs.

Figure 8:
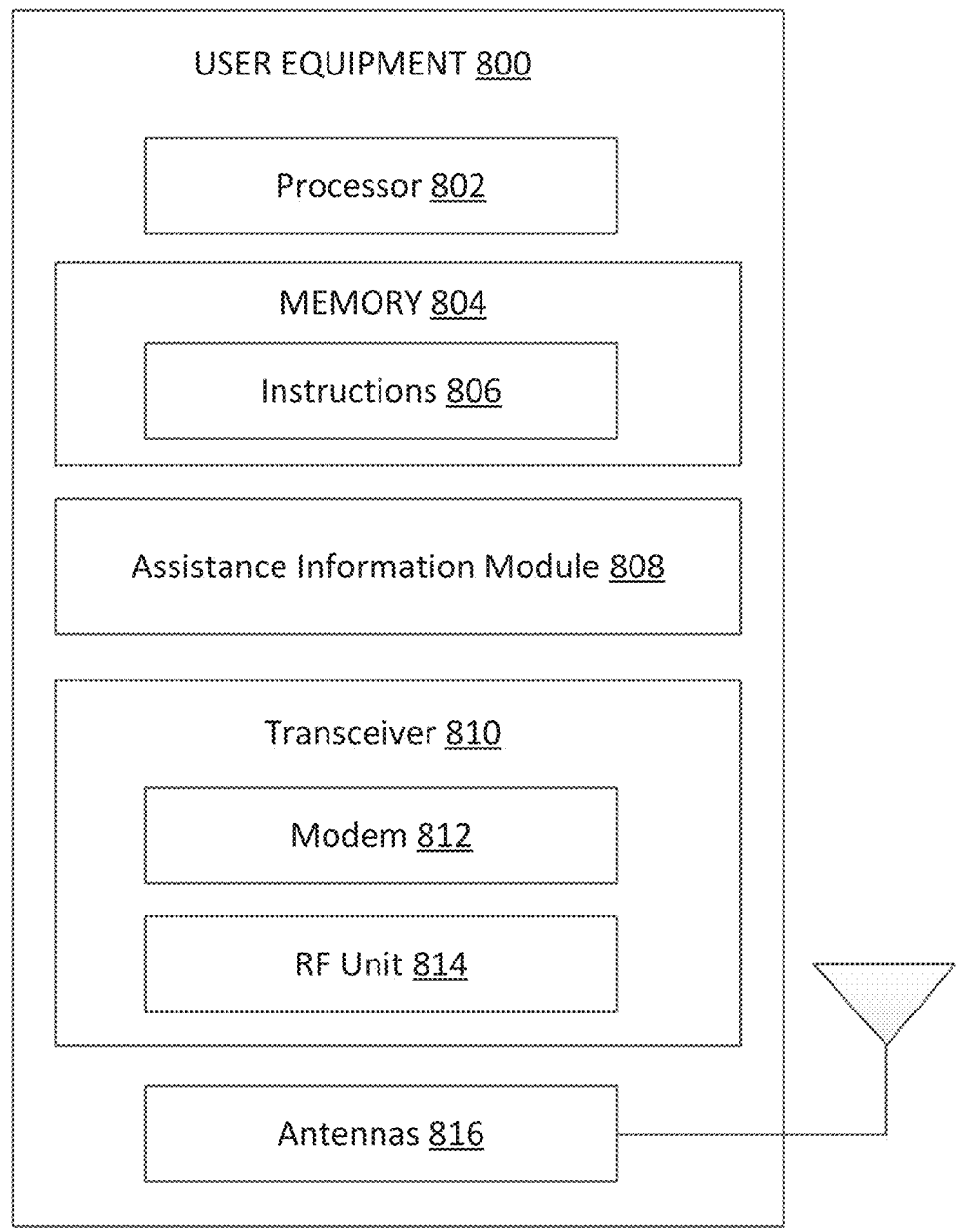
FIG. 8 illustrates a block diagram of a user equipment (UE) according to some aspects of the present disclosure.

FIG. 8 is a block diagram of an exemplary UE 800 according to some aspects of the present disclosure. The UE 800 may be a UE 115 as discussed in FIGS. 1-4. As shown, the UE 800 may include a processor 802, a memory 804, an assistance information module 808, a transceiver 810 including a modem subsystem 812 and a radio frequency (RF) unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to a UE 115 in connection with aspects of the present disclosure, for example, aspects of FIGS. 4-6 and 9-10. Instructions 806 may also be referred to as code, which may be interpreted broadly to include any type of computer-readable statement(s).

The assistance information module 808 may be implemented via hardware, software, or combinations thereof. For example, the assistance information module 808 may be implemented as a processor, circuit, and/or instructions 806 stored in the memory 804 and executed by the processor 802. In some aspects, the assistance information module 808 can be integrated within the modem subsystem 812. For example, the assistance information module 808 can be implemented by a combination of software components (e.g., executed by a DSP or a general processor) and hardware components (e.g., logic gates and circuitry) within the modem subsystem 812. The assistance information module 808 may communicate with one or more components of UE 800 to implement various aspects of the present disclosure, for example, aspects of FIGS. 4-6 and 9-10.

In some aspects, assistance information module 808 may be configured to transmit, to a wireless communication device (e.g., a BS 105, network unit 700, another UE, etc.), a rank indicator (RI). The RI may be transmitted as part of channel state feedback information. The channel state feedback may be transmitted, for example, via an RRC message, UL MAC CE, channel state information (CSI) message, a synchronization signal block (SSB), or other suitable communication, using PUCCH, PSCCH, or another suitable channel. In some aspects the RI is transmitted to another UE via sidelink (e.g., PSCCH) in a sidelink control information (SCI). The channel state feedback information may include a precoding matrix indicator (PMI) and/or a channel quality indicator (CQI) corresponding to the RI. The RI may define the number of possible transmission layers for the downlink transmission under specific channel conditions. The RI may correspond to a maximum number of uncorrelated paths that can be used for downlink transmission. The RI, however, may not contain information directly related to the number of antenna panels or modules used by the UE 800 in achieving the indicated RI.

The assistance information module 808 may be configured to transmit, to the wireless communication device, UE assistance information (UAI) associated with the RI. The UE assistance information may be transmitted together with the RI, for example in the same message. The UE 800 may transmit the UE assistance information via an RRC message, UCI, an UL MAC CE, or other suitable communication, using PUCCH, PSCCH or another suitable channel. The UE assistance information may indicate at least one of a quantity of antenna panels in use, a relative power consumption indicator, or a thermal overhead indicator. The UE assistance information, for example, may include only the quantity of antenna panels in use. In another example, the UE assistance information may include both a relative power consumption indicator and a thermal overhead indicator. In another example, the UE assistance information may only include a relative power consumption indicator. In some aspects, the UE assistance information may be transmitted in response to a request from the wireless communication device. That is, the UE 800 may receive a request for assistance from the wireless communication device, and transmit the UE assistance information in response to receiving the request. The request may be received, for example, via an RRC, DCI, SCI, or other suitable message via PDCCH, PSCCH, PUCCH, or other suitable channel. In other aspects, the UE assistance information may be sent in response to a change in the operation of the UE 800, such as a change in the number of antenna panels in use.

UE assistance information may be determined by the assistance information module 808 based on the RI and/or the number of antenna panels in use. For example, the relative power consumption indicator and/or the thermal overhead indicator may be based on values in a lookup table associated with the RI and the number of antenna panels in use as described with reference to FIGS. 5A and 5B. The lookup table may be stored at the UE 800 in memory 804. The value of the RI used in the lookup table may be based on polarization-based transmissions, or spatial MIMO transmissions.

The assistance information module 808 may be configured to receive, from the wireless communication device, a beam selection based on the RI and the UE assistance information. The beam selection may be received, for example, via an RRC, DCI, SCI, or other suitable message type using PUCCH, PDCCH, PSCCH, or other suitable channel. A beam selection may be received that is not the highest performing beam selection in terms of network characteristics if it has better relative power or thermal overhead characteristics and still performs sufficiently well.

The assistance information module 808 may use the received beam selection to configure beams for communication between the UE 800 and the wireless communication device, for example for PUSCH, PDSCH, and/or PSSCH communications. For example, a UE 800 that was previously using two antenna panels, each with a single transmit and/or receive beam, may receive a beam selection that allows the UE 800 to use two transmit and/or receive beams from the same antenna panel. By reducing the number of antenna panels and/or antenna modules in use, total power consumption of the UE 800 may be reduced in some instances.

As shown, the transceiver 810 may include the modem subsystem 812 and the RF unit 814. The transceiver 810 can be configured to communicate bi-directionally with other devices, such as the BS s 105 and 500. The modem subsystem 812 may be configured to modulate and/or encode the data from the memory 804 and/or the assistance information module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PUSCH, PSSCH, etc.) or of transmissions originating from another source such as a UE 115, or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 800 to enable the UE 800 to communicate with other devices.

The RF unit 814 may provide the modulated and/or processed data, e.g., data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., PDCCH DCI, MAC-CE, PSSCH, etc.) to the assistance information module 808 for processing. The antennas 816 may include multiple antennas of similar or different designs in order to sustain multiple transmission links. Antennas 816 may include multiple antenna modules, each associated with a different antenna panel. Antenna panels may be used to transmit and/or receive using beamforming techniques.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

Figure 9:
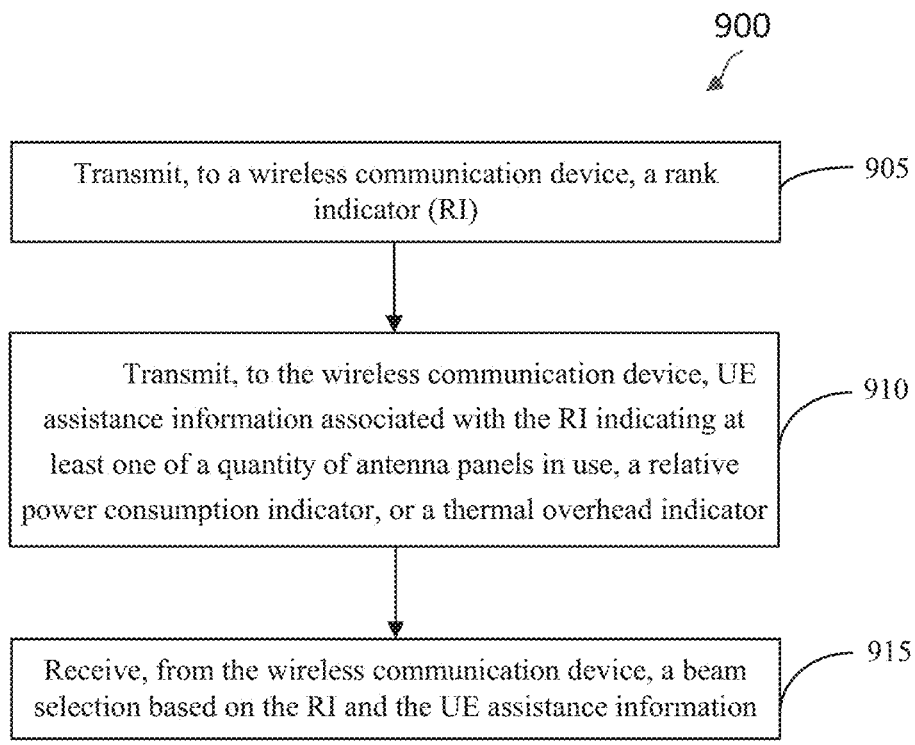
FIG. 9 is a flow diagram of a wireless communication method performed by a user equipment (UE) according to some aspects of the present disclosure.

FIG. 9 is a flow diagram illustrating a wireless communication method 900 according to some aspects of the present disclosure. Aspects of the method 900 can be executed by a computing device (e.g., a processor, processing circuit, and/or other suitable component) of a wireless communication device or other suitable means for performing the blocks. In one aspect, a UE 115, or 800, may perform the method 900 utilizing components such as the processor 802, the memory 804, the assistance information module 808, the transceiver 810, the modem 812, and the one or more antennas 816 shown in FIG. 8.

As illustrated, the method 900 includes a number of enumerated blocks, but aspects of the method 900 may include additional blocks before, after, and in between the enumerated blocks. In some aspects, one or more of the enumerated blocks may be omitted or performed in a different order.

At block 905, a UE (e.g., UE 115, UE 800, or other UE) transmits, to a wireless communication device, a rank indicator (RI). The RI may be transmitted as part of channel state feedback information. The channel state feedback may be transmitted, for example, via an RRC message, UL MAC CE, channel state information (CSI) message, a synchronization signal block (SSB), or other suitable communication, using PUCCH, PSCCH, or another suitable channel. In some aspects the RI is transmitted to another UE via sidelink (e.g., PSCCH) in a sidelink control information (SCI). The channel state feedback information may include a precoding matrix indicator (PMI) and/or a channel quality indicator (CQI) corresponding to the RI. The RI may define the number of possible transmission layers for the downlink transmission under specific channel conditions. The RI may correspond to a maximum number of uncorrelated paths that can be used for downlink transmission. The RI, however, may not contain information directly related to the number of antenna panels or modules used by the UE in achieving the indicated RI. In some aspects, the wireless communication device is a network unit (e.g., BS 105, which may be a gNB, one or more components of disaggregated base station 200 (e.g., CU 210, DU 230, and/or RU 240), network unit 700, or other network unit). In some aspects, the wireless communication device is another UE (e.g., UE 115, UE 800, or other UE), which may communicate via sidelink communication.

At block 910, the UE transmits, to the wireless communication device, UE assistance information (UAI) associated with the RI. The UE assistance information may be transmitted together with the RI, for example in the same message. The UE may transmit the UE assistance information via an RRC message, UCI, an UL MAC CE, or other suitable communication, using PUCCH, PSCCH or another suitable channel. The UE assistance information may indicate at least one of a quantity of antenna panels in use, a relative power consumption indicator, or a thermal overhead indicator. The UE assistance information, for example, may include only the quantity of antenna panels in use. In another example, the UE assistance information may include both a relative power consumption indicator and a thermal overhead indicator. In another example, the UE assistance information may only include a relative power consumption indicator. In some aspects, the UE assistance information may be transmitted in response to a request from the wireless communication device. That is, the UE may receive a request for assistance from the wireless communication device, and transmit the UE assistance information in response to receiving the request. The request may be received, for example, via an RRC, DCI, SCI, or other suitable message via PDCCH, PSCCH, PUCCH, or other suitable channel. In other aspects, the UE assistance information may be sent in response to a change in the operation of the UE, such as a change in the number of antenna panels in use.

UE assistance information may be determined by the UE based on the RI and/or the number of antenna panels in use. For example, the relative power consumption indicator and/or the thermal overhead indicator may be based on values in a lookup table associated with the RI and the number of antenna panels in use as described with reference to FIGS. 5A and 5B. The lookup table may be stored at the UE. The value of the RI used in the lookup table may be based on polarization-based transmissions, or spatial MIMO transmissions.

In some instances, the number of possible values, and therefore the granularity, associated with the relative power consumption indicator may be different than the number of possible values for the thermal overhead indicator. For example, the thermal overhead may have four possible values, and the relative power consumption indicator may have eight possible values. Further, the power consumption indicator and the thermal overhead indicator may share a joint metric (value). For example, as described with respect to FIG. 5a, a single metric may represent a combined value that is based on both the relative power consumption and the thermal overhead. Relative power consumption and thermal overhead may be quantified in terms of a percentage metric, or a proportional metric. In some aspects, values in the table may include human-readable values such as "lowest", "intermediate", and "highest". In other aspects, values may be numerical, for example values in the range of 1-8, or 1-16. The interpretation of the values may be predetermined or determined by a standard. For example, the relative power indicator may have possible values in the range of 1-16, which may represent 0-100% of maximum power dissipation allowed or possible by the UE or subcomponents of the UE. In further aspects, the values may have a value that represents a real value such as power in mW.

At block 915, the UE receives, from the wireless communication device, a beam selection based on the RI and the UE assistance information. The beam selection may be received, for example, via an RRC, DCI, SCI, or other suitable message type using PUCCH, PDCCH, PSCCH, or other suitable channel. A beam selection may be received that is not the highest performing beam selection in terms of network characteristics if it has better relative power or thermal overhead characteristics and still performs sufficiently well.

The UE may use the received beam selection to configure beams for communication between the UE and the wireless communication device, for example for PUSCH, PDSCH, and/or PSSCH communications. For example, a UE that was previously using two antenna panels, each with a single transmit and/or receive beam, may receive a beam selection that allows the UE to use two transmit and/or receive beams from the same antenna panel. By reducing the number of antenna panels and/or antenna modules in use, total power consumption of the UE may be reduced in some instances.

Figure 10:
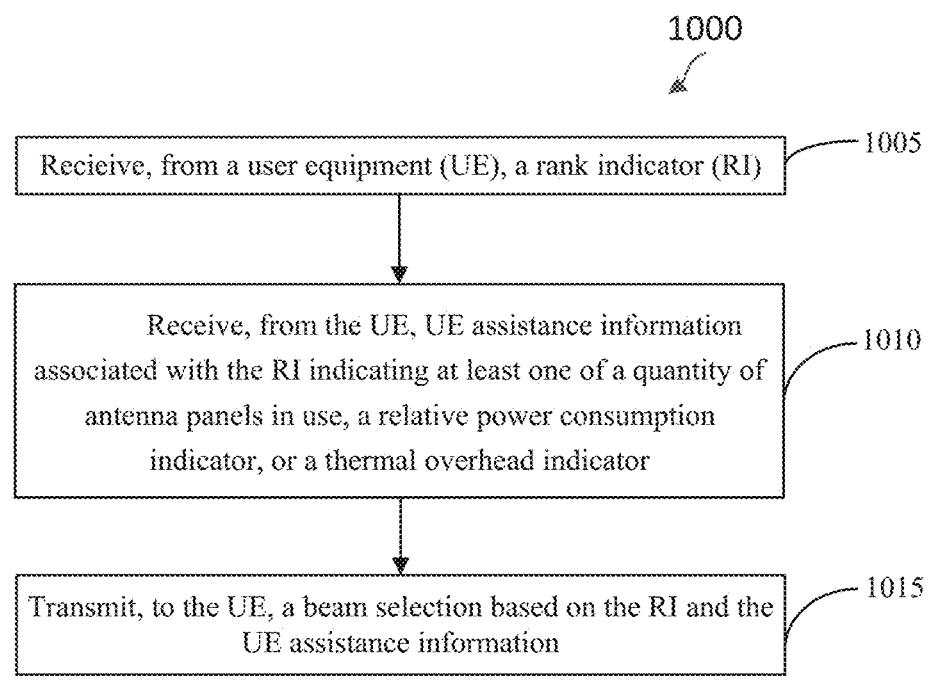
FIG. 10 is a flow diagram of a wireless communication method performed by a wireless communication device according to some aspects of the present disclosure.

FIG. 10 is a flow diagram illustrating a wireless communication method 1000 according to some aspects of the present disclosure. Aspects of the method 1000 can be executed by a computing device (e.g., a processor, processing circuit, and/or other suitable component) of a wireless communication device or other suitable means for performing the blocks. In one aspect, a BS 105, a CU 210 and/or DU 230, or network unit 700, may perform the method 1000 utilizing components such as the processor 702, the memory 704, the wireless communication device, the transceiver 710, the modem 712, and the one or more antennas 716 shown in FIG. 7. In another aspect, a UE 115, or 800, may perform the method 1000 utilizing components such as the processor 802, the memory 804, the assistance information module 808, the transceiver 810, the modem 812, and the one or more antennas 816 shown in FIG. 8.

As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1005, a wireless communication device (e.g., UE 115, UE 800, BS 105, network unit 700, CU 210, DU 230, and/or RU 240) receives, from a user equipment (UE), a rank indicator (RI). The RI may be received as part of channel state feedback information. The channel state feedback may be received, for example, via an RRC message, UL MAC CE, channel state information (CSI) message, a synchronization signal block (SSB), or other suitable communication, using PUCCH, PSCCH, or another suitable channel. The channel state feedback information may include a precoding matrix indicator (PMI) and/or a channel quality indicator (CQI) corresponding to the RI. The RI may define the number of possible transmission layers for the downlink transmission under specific channel conditions. The RI may correspond to a maximum number of uncorrelated paths that can be used for downlink transmission. The RI, however, may not contain information directly related to the number of antenna panels or modules used by the UE in achieving the indicated RI. In some aspects, the wireless communication device is a network unit (e.g., BS 105, which may be a gNB, one or more components of disaggregated base station 200 (e.g., CU 210, DU 230, and/or RU 240), network unit 700, or other network unit). In some aspects, the wireless communication device is another UE (e.g., UE 115, UE 800, or other UE), which may communicate via sidelink communication.

At action 1010, the wireless communication device receives, from the UE, UE assistance information (UAI) associated with the RI. The UE assistance information may be received together with the RI, for example in the same message. The wireless communication device may receive the UE assistance information via an RRC message, UCI, an UL MAC CE, or other suitable communication, using PUCCH, PSCCH or another suitable channel. The UE assistance information may indicate at least one of a quantity of antenna panels in use, a relative power consumption indicator, or a thermal overhead indicator. The UE assistance information, for example, may include only the quantity of antenna panels in use. In another example, the UE assistance information may include both a relative power consumption indicator and a thermal overhead indicator. In another example, the UE assistance information may only include a relative power consumption indicator. In some aspects, the UE assistance information may be received in response to a request from the wireless communication device. That is, the wireless communication device may transmit a request for assistance to the UE, and receive the UE assistance information in response to transmitting the request. The request may be transmitted, for example, via an RRC, DCI, SCI, or other suitable message via PDCCH, PSCCH, PUCCH, or other suitable channel. In other aspects, the UE assistance information may be received in response to a change in the operation of the UE, such as a change in the number of antenna panels in use.

At action 1015, the wireless communication device transmits, to the UE, a beam selection based on the RI and the UE assistance information. The beam selection may be transmitted, for example, via an RRC, DCI, SCI, or other suitable message type using PUCCH, PDCCH, PSCCH, or other suitable channel. The wireless communication device may determine a beam selection that is not the highest performing beam selection in terms of network characteristics if it has better relative power or thermal overhead characteristics and still performs sufficiently well.

Subsequent communication with the UE may be based on the beam selection, for example for PUSCH, PDSCH, and/or PSSCH communications. For example, the wireless communication device may have previously communicated with the UE that was using two antenna panels, each with a single transmit and/or receive beam. The wireless communication device may transmit a beam selection that allows the UE to use two transmit and/or receive beams from the same antenna panel. By reducing the number of antenna panels and/or antenna modules in use, total power consumption of the UE may be reduced in some instances.

The wireless communication device may also base the beam selection on an interference measurement associated with an uplink transmission or transmissions of the UE, preferring a beam selection that has less interference. In aspects where only the number of panels is communicated as the UE assistance information, the wireless communication device may estimate the relative power consumption and thermal overhead based on that information together with the RI.

Further aspects of the present disclosure include the following:

Aspect 1. A method of wireless communication performed by a user equipment (UE), the method comprising:
 transmitting, to a wireless communication device, a rank indicator (RI);
 transmitting, to the wireless communication device, UE assistance information, the UE assistance information indicates at least one of:
  an indication of a quantity of antenna panels in use;
  a relative power consumption indicator; or
  a thermal overhead indicator; and
 receiving, from the wireless communication device, a beam selection based on the RI and the UE assistance information.

Aspect 2. The method of aspect 1, wherein the transmitting the UE assistance information comprises:
 transmitting the UE assistance information in response to a request from the wireless communication device.

Aspect 3. The method of aspect 1, wherein the transmitting the UE assistance information comprises:
 transmitting the UE assistance information in response to a change in antenna panel usage.

Aspect 4. The method of any of aspects 1-3, wherein the UE assistance information includes a first value representative of the relative power consumption indicator and a second value representative of the thermal overhead indicator.

Aspect 5. The method of any of aspects 1-3, wherein the UE assistance information includes a joint value that indicates the relative power consumption indicator and the thermal overhead indicator.

Aspect 6. The method of any of aspects 1-5, wherein the UE assistance information is based on a lookup table stored at the UE, and wherein a value in the lookup table is determined based on the RI and the quantity of antenna panels in use.

Aspect 7. The method of aspect 6, wherein the RI in the lookup table is based on polarization-based transmissions or spatial MIMO transmissions.

Aspect 8. The method of any of aspects 1-7, further comprising:
determining at least one of the relative power consumption indicator or the thermal overhead indicator,
wherein a quantity of possible values for the relative power consumption indicator is greater than a quantity of possible values for the thermal overhead indicator.

Aspect 9. The method of any of aspects 1-8, wherein the beam selection is further based on an interference measurement associated with an uplink transmission of the UE.

Aspect 10. The method of any of aspects 1-9, wherein the wireless communication device is a base station.

Aspect 11. The method of any of aspects 1-10, wherein the wireless communication device is a second UE.

Aspect 12. A method of wireless communication performed by a wireless communication device, the method comprising:
receiving, from a user equipment (UE), a rank indicator (RI)
receiving, from the UE, UE assistance information, the UE assistance information indicates at least one of:
an indication of a quantity of antenna panels in use;
a relative power consumption indicator; or
a thermal overhead indicator; and
transmitting, to the UE, a beam selection based on the RI and the UE assistance information.

Aspect 13. The method of aspect 12, further comprising:
transmitting, to the UE, a request for the UE assistance information,
wherein the receiving the UE assistance information comprises:
receiving, from the UE, the UE assistance information in response to the request for the UE assistance information.

Aspect 14. The method of any of aspects 12-13, wherein the UE assistance information includes a first value representative of the relative power consumption indicator and a second value representative of the thermal overhead indicator.

Aspect 15. The method of any of aspects 12-13, wherein the UE assistance information includes a joint value that indicates the relative power consumption indicator and the thermal overhead indicator.

Aspect 16. The method of any of aspects 12-15, wherein the UE assistance information is based on a lookup table stored at the UE, and wherein a value in the lookup table is determined based on the RI and the quantity of antenna panels in use.

Aspect 17. The method of aspect 16, wherein the RI in the lookup table is based on polarization-based transmissions or spatial MIMO transmissions.

Aspect 18. The method of any of aspects 12-17, wherein a quantity of possible values for the relative power consumption indicator is greater than a quantity of possible values for the thermal overhead indicator.

Aspect 19. The method of any of aspects 12-18, wherein the beam selection is further based on an interference measurement associated with an uplink transmission of the UE.

Aspect 20. The method of any of aspects 12-19, wherein the wireless communication device is a base station.

Aspect 21. The method of any of aspects 12-20, wherein the wireless communication device is a second UE.

Aspect 22. A user equipment (UE) comprising:
a transceiver configured to:
transmit, to a wireless communication device, a rank indicator (RI);
transmit, to the wireless communication device, UE assistance information, the UE assistance information indicates at least one of:
an indication of a quantity of antenna panels in use;
a relative power consumption indicator; or
a thermal overhead indicator; and
receive, from the wireless communication device, a beam selection based on the RI and the UE assistance information.

Aspect 23. The UE of aspect 22, wherein the transmitting the UE assistance information comprises:
transmitting the UE assistance information in response to a request from the wireless communication device.

Aspect 24. The UE of aspect 22, wherein the transmitting the UE assistance information comprises:
transmitting the UE assistance information in response to a change in antenna panel usage.

Aspect 25. The UE of any of aspects 22-24, wherein the UE assistance information includes a first value representative of the relative power consumption indicator and a second value representative of the thermal overhead indicator.

Aspect 26. The UE of any of aspects 22-24, wherein the UE assistance information includes a joint value that indicates the relative power consumption indicator and the thermal overhead indicator.

Aspect 27. The UE of any of aspects 22-26, wherein the UE assistance information is based on a lookup table stored at the UE, and wherein a value in the lookup table is determined based on the RI and the quantity of antenna panels in use.

Aspect 28. The UE of aspect 27, wherein the RI in the lookup table is based on polarization-based transmissions or spatial MIMO transmissions.

Aspect 29. The UE of any of aspects 22-28, further comprising:
a processor configured to:
determine at least one of the relative power consumption indicator or the thermal overhead indicator,
wherein a quantity of possible values for the relative power consumption indicator is greater than a quantity of possible values for the thermal overhead indicator.

Aspect 30. The UE of any of aspects 22-29, wherein the beam selection is further based on an interference measurement associated with an uplink transmission of the UE.

Aspect 31. The UE of any of aspects 22-30, wherein the wireless communication device is a base station.

Aspect 32. The UE of any of aspects 22-31, wherein the wireless communication device is a second UE.

Aspect 33. A wireless communication device, comprising:
a transceiver configured to:
receive, from a user equipment (UE), a rank indicator (RI)
receive, from the UE, UE assistance information, the UE assistance information indicates at least one of:
an indication of a quantity of antenna panels in use;
a relative power consumption indicator; or
a thermal overhead indicator; and
transmit, to the UE, a beam selection based on the RI and the UE assistance information.

Aspect 34. The wireless communication device of aspect 33, wherein the transceiver is further configured to:
transmit, to the UE, a request for the UE assistance information,
wherein the receiving the UE assistance information comprises:
receiving, from the UE, the UE assistance information in response to the request for the UE assistance information.

Aspect 35. The wireless communication device of any of aspects 33-34, wherein the UE assistance information includes a first value representative of the relative power consumption indicator and a second value representative of the thermal overhead indicator.

Aspect 36. The wireless communication device of any of aspects 33-34, wherein the UE assistance information includes a joint value that indicates the relative power consumption indicator and the thermal overhead indicator.

Aspect 37. The wireless communication device of any of aspects 33-36, wherein the UE assistance information is based on a lookup table stored at the UE, and wherein a value in the lookup table is determined based on the RI and the quantity of antenna panels in use.

Aspect 38. The wireless communication device of aspect 37, wherein the RI in the lookup table is based on polarization-based transmissions or spatial MIMO transmissions.

Aspect 39. The wireless communication device of any of aspects 33-38, wherein a quantity of possible values for the relative power consumption indicator is greater than a quantity of possible values for the thermal overhead indicator.

Aspect 40. The wireless communication device of any of aspects 33-39, wherein the beam selection is further based on an interference measurement associated with an uplink transmission of the UE.

Aspect 41. The wireless communication device of any of aspects 33-40, wherein the wireless communication device is a base station.

Aspect 42. The wireless communication device of any of aspects 33-41, wherein the wireless communication device is a second UE.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
transmitting, to a wireless communication device, a rank indicator (RI);
transmitting, to the wireless communication device, UE assistance information (UAI) associated with the RI, the UAI indicates at least one of:
an indication of a quantity of antenna panels in use;
a relative power consumption indicator; or
a thermal overhead indicator; and
receiving, from the wireless communication device, a beam selection based on the RI and the UAI,
wherein the UAI is based on a lookup table stored at the UE, and
wherein a value in the lookup table is determined based on the RI and the quantity of antenna panels in use.

2. The method of claim 1, wherein the transmitting the UAI comprises:
transmitting the UAI in response to at least one of:
a request from the wireless communication device, or
a change in antenna panel usage.

3. The method of claim 1, wherein the UAI includes a first value representative of the relative power consumption indicator and a second value representative of the thermal overhead indicator.

4. The method of claim 1, wherein the UAI includes a joint value that indicates the relative power consumption indicator and the thermal overhead indicator.

5. The method of claim 1, wherein the RI in the lookup table is based on polarization-based transmissions or spatial MIMO transmissions.

6. The method of claim 1, further comprising:
determining at least one of the relative power consumption indicator or the thermal overhead indicator,
wherein a quantity of possible values for the relative power consumption indicator is greater than a quantity of possible values for the thermal overhead indicator.

7. The method of claim 1, wherein the beam selection is further based on an interference measurement associated with an uplink transmission of the UE.

8. A method of wireless communication performed by a wireless communication device, the method comprising:
receiving, from a user equipment (UE), a rank indicator (RI);
receiving, from the UE, UE assistance information (UAI), the UAI indicates at least one of:
an indication of a quantity of antenna panels in use;
a relative power consumption indicator; or
a thermal overhead indicator; and
transmitting, to the UE, a beam selection based on the RI and the UAI,
wherein the UAI is based on a lookup table stored at the UE, and
wherein a value in the lookup table is determined based on the RI and the quantity of antenna panels in use.

9. The method of claim 8, further comprising:
transmitting, to the UE, a request for the UAI,
wherein the receiving the UAI comprises:
receiving, from the UE, the UAI in response to the request for the UAI.

10. The method of claim 8, wherein the UAI includes a first value representative of the relative power consumption indicator and a second value representative of the thermal overhead indicator.

11. The method of claim 8, wherein the UAI includes a joint value that indicates the relative power consumption indicator and the thermal overhead indicator.

12. The method of claim 8, wherein a quantity of possible values for the relative power consumption indicator is greater than a quantity of possible values for the thermal overhead indicator.

13. The method of claim 8, wherein the beam selection is further based on an interference measurement associated with an uplink transmission of the UE.

14. A user equipment (UE) comprising:
a transceiver configured to:
transmit, to a wireless communication device, a rank indicator (RI);
transmit, to the wireless communication device, UE assistance information (UAI),
the UAI indicates at least one of:
an indication of a quantity of antenna panels in use;
a relative power consumption indicator; or
a thermal overhead indicator; and
receive, from the wireless communication device, a beam selection based on the RI and the UAI,
wherein the UAI is based on a lookup table stored at the UE, and
wherein a value in the lookup table is determined based on the RI and the quantity of antenna panels in use.

15. The UE of claim 14, wherein the transmitting the UAI comprises:
transmitting the UAI in response to at least one of:
a request from the wireless communication device, or
a change in antenna panel usage.

16. The UE of claim 14, wherein the UAI includes a first value representative of the relative power consumption indicator and a second value representative of the thermal overhead indicator.

17. The UE of claim 14, wherein the UAI includes a joint value that indicates the relative power consumption indicator and the thermal overhead indicator.

18. The UE of claim 14, wherein the RI in the lookup table is based on polarization-based transmissions or spatial MIMO transmissions.

19. The UE of claim 14, further comprising:
a processor configured to:
determine at least one of the relative power consumption indicator or the thermal overhead indicator,
wherein a quantity of possible values for the relative power consumption indicator is greater than a quantity of possible values for the thermal overhead indicator.

20. The UE of claim 14, wherein the beam selection is further based on an interference measurement associated with an uplink transmission of the UE.

21. A wireless communication device, comprising:
a transceiver configured to:
receive, from a user equipment (UE), a rank indicator (RI);
receive, from the UE, UE assistance information (UAI), the UAI indicates at least one of:
an indication of a quantity of antenna panels in use;
a relative power consumption indicator; or
a thermal overhead indicator; and
transmit, to the UE, a beam selection based on the RI and the UAI,
wherein the UAI is based on a lookup table stored at the UE, and
wherein a value in the lookup table is determined based on the RI and the quantity of antenna panels in use.

22. The wireless communication device of claim 21, wherein the transceiver is further configured to:
transmit, to the UE, a request for the UAI,
wherein the receiving the UAI comprises:
receiving, from the UE, the UAI in response to the request for the UAI.

23. The wireless communication device of claim 21, wherein the UAI includes a first value representative of the relative power consumption indicator and a second value representative of the thermal overhead indicator.

24. The wireless communication device of claim 21, wherein the UAI includes a joint value that indicates the relative power consumption indicator and the thermal overhead indicator.

25. The wireless communication device of claim 21, wherein a quantity of possible values for the relative power consumption indicator is greater than a quantity of possible values for the thermal overhead indicator.

26. The wireless communication device of claim 21, wherein the beam selection is further based on an interference measurement associated with an uplink transmission of the UE.

* * * * *